United States Patent [19]

Johanneck

[11] 4,366,773

[45] Jan. 4, 1983

[54] VENTILATION AND FEEDING SYSTEM FOR ANIMAL SHELTER

[76] Inventor: Richard G. Johanneck, P.O. Box 13A, Rte. 1, Litchfield, Minn. 55355

[21] Appl. No.: 246,198

[22] Filed: Mar. 23, 1981

[51] Int. Cl.³ .............................................. A01K 1/00
[52] U.S. Cl. ........................................ 119/16; 119/19
[58] Field of Search .................... 119/20, 16, 18, 19, 119/61, 51.5, 21, 27; 98/122, 83; D32/53; 220/94 A

[56] References Cited

U.S. PATENT DOCUMENTS

| | | | |
|---|---|---|---|
| 1,213,884 | 1/1917 | Knowles | 98/122 |
| 2,419,834 | 4/1947 | Grindstaff | 119/51.5 |
| 2,522,820 | 9/1950 | Haberkorn | 119/71 |
| 2,946,308 | 7/1960 | Harris | 119/18 |
| 3,172,392 | 3/1965 | Schultz | 119/20 |
| 4,011,951 | 3/1977 | Boyer | 119/61 X |
| 4,161,924 | 7/1979 | Welker | 119/19 |

OTHER PUBLICATIONS

Dairy Herd Management, Jan. 1981–Front Cover only.
Dairy Herd Management, Jan. 1981, p. 36.
Brochure Calf Hutch, by Poly Tank Company.

Primary Examiner—Hugh R. Chamblee
Attorney, Agent, or Firm—Kinney, Lange, Braddock, Westman and Fairbairn

[57] ABSTRACT

A freestanding one-piece shelter for young animals is provided with a ventilation and feeding system. The ventilation system includes an opening in an exterior wall of the shelter for circulation and a vent at the top of the shelter. The vent comprises a raised portion on the roof of the shelter covered by a cap. The raised portion has ventilation openings. The underside of the cap is fitted with lugs to rest on the raised portion to hold the cap in its raised position. The lugs fit in the ventilation openings when the cap is rotated to its lowered position. The opening in the side of the shelter is also used for access to the feeding station. The feeding station includes a flange which engages the lower edge of the opening. The feeding station has at least one generally circular fitting with a tapered lip which receives a tapered feeding bucket. The tapered feeding bucket has a raised splash guard. Adjacent to the feeding station is a bottle bracket which allows a nippled bottle of animal feed to be inserted in the side of the shelter at a downward angle so that a young animal can feed from the inside.

11 Claims, 6 Drawing Figures

VENTILATION AND FEEDING SYSTEM FOR ANIMAL SHELTER

BACKGROUND OF THE INVENTION

1. Field of the Invention

The present invention relates to a ventilation and feeding improvement in freestanding shelters for young animals.

2. Description of the Prior Art

It is common in the prior art to separate young animals by providing individual, preformed shelters. These are usually formed from fiberglass or polyethylene. They provide a clean, easy to maintain shelter which separates the animals, reducing transfer of disease. Such a hutch eliminates dampness and crowding. It is difficult, however, to design such a shelter so that it will restrain the animal and yet provide adequate ventilation and easy access for feeding. If complicated doors or windows are used, the cost of the unit rises to a point where it is no longer feasible. An inexpensive means was needed to put the young animal into the shelter, remove it from the shelter, provide adequate ventilation, and feed the animal without spilling. An example of such a shelter is shown on the cover of the January 1981 issue of the magazine entitled "Dairy Herd Management". Another example is shown on page 36 of the same issue. This latter example is a rectangular shelter from which the animal can walk.

SUMMARY OF THE INVENTION

The present invention relates to an improvement in freestanding shelters for young animals. The improvement comprises a ventilation and feeding system. The ventilation portion of this system includes an opening in the side of the shelter and a vent in the top. The vent is a raised neck portion with ventilation openings. This raised portion is covered by a cap which rotates about the raised portion. The underside of the circular cap has lugs which fit in the vent openings when the cap is rotated to its lowered position and rest atop the raised portion to hold the cap in its raised position.

The feeding portion of the system uses the opening in the side of the shelter for attaching a feeding station, which is provided with a protruding flange to engage the lower edge of the opening. The feeding station has at least one generally circular fitting with a lip constructed to receive a feeding bucket. A tapered bucket has a raised splash guard to prevent food from falling out of the bucket and opening. The feeding system also has a bottle bracket extending through the wall of the shelter adjacent to the opening into which a nippled bottle of liquid animal feed can be inserted, so that an animal can feed from the nipple on the inside of a shelter.

DETAILED DESCRIPTION OF PREFERRED EMBODIMENT

Figure 1:
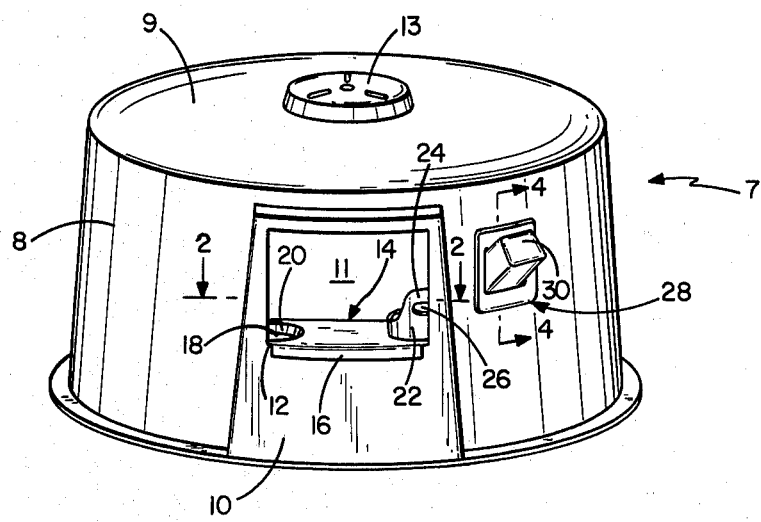
FIG. 1 is a perspective view of a freestanding, one-piece animal shelter.

A one-piece, molded plastic freestanding shelter 7 is shown in FIG. 1. Shelter 7 has a generally circular exterior side wall 8 and a roof 9. Extending from wall 8 is a bay 10. In bay 10 is an opening 11 with a lower edge 12. Opening 11, is used for animal access, ventilation and feed access. A vent apparatus 13 provides roof ventilation. A feeding station 14, which has a bucket support 15, is attached by flange 16 to the lower edge 12 of opening 11. Generally circular fittings 13 have tapered lips 20, constructed to receive and hold receptacles or pails such as tapered bucket 22. Tapered bucket 22 has splash guard 24 which includes handle 26. Also part of the feeding station is bottle bracket 28. Bottle bracket 28 is shown as holding bottle 30 on a downward angle extending into the shelter.

In usual farm operation, a calf or other young animal is put into the shelter through opening 11 or by lifting the entire shelter 7 and putting it around the calf. Once inside, a calf can live for the period until it is ready to rejoin the herd. Opening 11 is at an appropriate height for the young animal to extend its head outside. The calf can feed from tapered feed buckets 22 or from bottle 30. The animal can only leave the shelter through opening 11. Before it is old enough to escape through opening 11, the animal is removed to rejoin the herd or put in other feeding pens.

Figure 2:
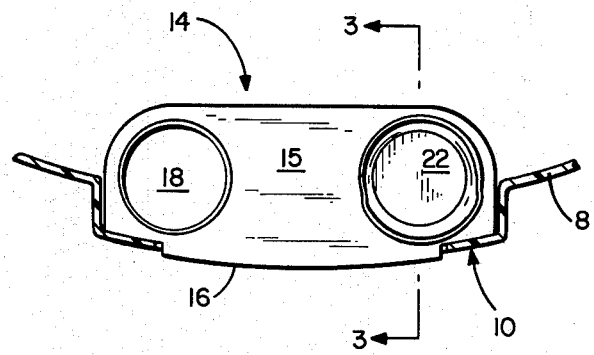
FIG. 2 is a sectional view of the feeding station taken along the line 2—2 of FIG. 1.
Figure 3:
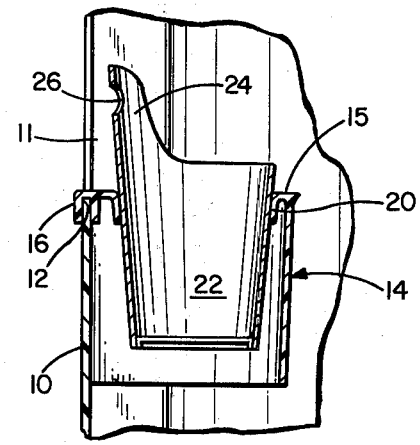
FIG. 3 is a vertical cross sectional view of the feeding station and tapered feed bucket taken along line 3—3 of FIG. 2.

The feeding station 14 is shown in greater detail in FIG. 2. Feeding station 14 is shaped to fit against the bay 32 in the wall 8 of the shelter 7. The tapered feeding bucket 22 is inserted downward into fitting 18. The detail of this insertion is shown in FIGS. 2 and 3. Feeding station 14 has a flange 16 which engages the bottom edge 12 of opening 11. Flange 16 fits over this edge 12. The fitting 18 has a tapered lip 20 which conforms to the shape of tapered feeding bucket 22. Once the tapered feeding bucket is inserted in opening 18, friction holds it in position. The feeding animal cannot tip of dislodge the bucket. Vertical splash guard 24 prevents spilling of food while the animal feeds. Commonly, young animals such as calves will splash food away from them up over the edge of the feeding device. Vertical splash guard 24 will return it to the bucket. Vertical splash guard 24 is fitted with handle 26, which is, in this embodiment, an opening in the vertical splash guard 24. Note that the splash guard is integrally molded to the rest of the bucket and extends substantially 180° around the bucket.

Figure 4:
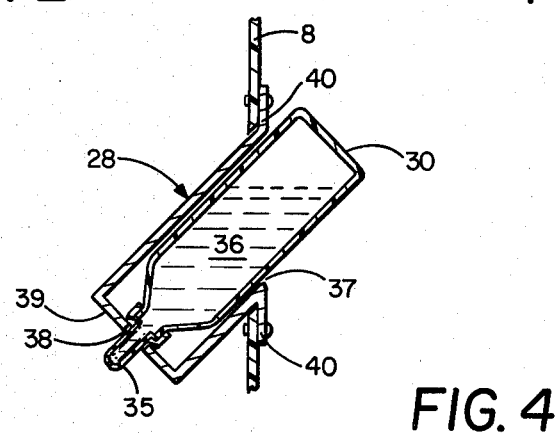
FIG. 4 is a vertical cross section of the bottle bracket taken along the line 4—4 of FIG. 1.

Detail of bottle bracket 28 is shown in FIG. 4. In this embodiment, bottle bracket 28 is an enclosed box which extends through wall 8 at a downward angle to the inside of the shelter 7. Bottle 30 has a nipple 35 from which the young animal draws liquid food 36 from the bottle 30. Bottle bracket 28 forms an interior receptacle shaped to conform to the exterior shape of bottle 30. Bottle bracket 28 has an opening 37 in wall 8 through which bottle 30 is inserted from outside shelter 7. Bottle bracket 28 has a nipple opening 38 in its inner end wall 39. Nipple 35 fits in opening 38 in a position accessible for feeding by the young animal. The bottle bracket opening 37 is defined by a bracket flange 40 which fastens to the wall 8 of the shelter, holding the majority of bottle bracket inside the shelter. The opening 37 allows insertion of the bottle 30 from outside the shelter.

Figure 5:
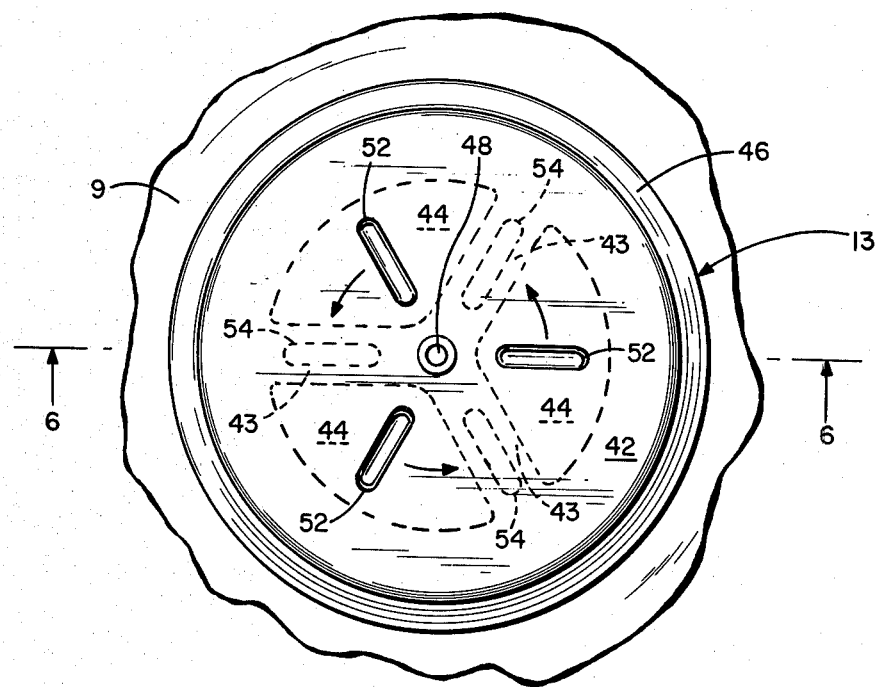
FIG. 5 is a top plan view of a vent in the roof of the shelter.

FIG. 5 shows a top view of the vent assembly 13. In this embodiment, the vent comprises a circular neck 41 (see FIG. 6) defining raised area 42. Raised area 42 has 5 ventilation openings 44 outlined in dotted lines. In this embodiment, there are three ventilation openings defined by webs or wall portions 43. Circular raised area 42 is covered by ventilation cap 46. Ventilation cap 46 has central post 48, which extends through a hole fitting 50 defined in the center region where webs 43 join. Central post 48 is free to slide and rotate within fitting 50. A plurality of lugs 52 protrude from the underside of ventilation cap 46. Lugs 52 as shown in FIG. 5, fit inside of ventilation openings 44 when ventilation cap 46 is in a lowered position. When cap 46 is lifted and rotated to its raised position each of the lugs 52 rests on one of the webs 43, as shown at 54, shown in dotted lines.

Figure 6:
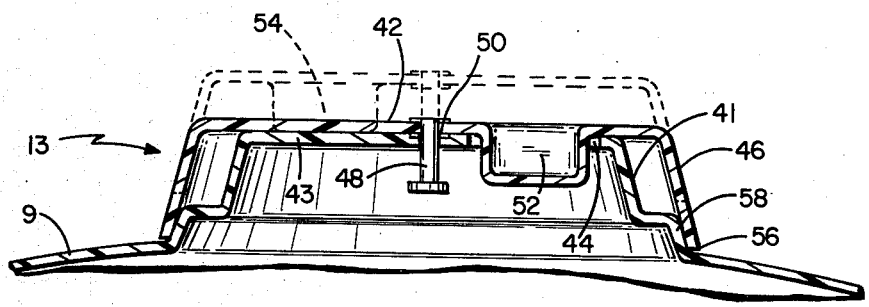
FIG. 6 is a vertical cross sectional view of the vent taken along the line 6—6 of FIG. 5.

FIG. 6 shows ventilation cap 46 in its lowered or closed position in solid lines. The dotted lines in FIG. 6 show ventilation cap 46 in an open or raised position. In the lowered position, lugs 52 lie within ventilation openings 44, lower peripheral ledge 56 of cap 46 seals tightly against shoulder 58 of raised neck 41. When ventilation cap 46 is lifted, post 48 is raised in hole fitting 50. Cap 46 then is rotated about central post 48 until lugs 52 are no longer above ventilation openings 44. Cap 46 is then lowered so that lugs 52 rest at positions 54. Air can then escape upward through ventilation openings 44 and out from underneath ventilation cap 46 along edge 45. Air then flows in through opening 10 and out through openings 44 in the top of the shelter. Opening 10 is large enough for ventilation, feed access, and animal insertion, but reduces the potential of damage from wind gusts which could lift the shelter.

Shelter 8 can be formed from polyethylene or other moldable plastic. It can also be constructed of fiberglass or other material which can form a rigid shelter.

The fittings 18 can hold other feed buckets, such as ordinary plastic pails, of desired, and with two fittings 18 both liquid and solids can be fed at once. A bottle will be used until the animal can learn to drink from a pail.

I claim:

1. In a freestanding shelter for young animals having a curved exterior side wall, the improvement of a ventilation and feeding system comprising:

an opening in the curved exterior side wall of a shelter having a lower edge appropriately upwardly spaced from the bottom of the shelter for a standing young animal to insert its head;

a feeding station comprising a bucket support conforming in shape to the curved shape of the shelter wall, said feeding station having a flange for engaging the lower edge of the opening to support the feeding station;

said feeding station having at least one generally circular fitting of size to receive and hold a feed bucket;

a bottle bracket adjacent to the opening for holding a bottle having a nipple thereon, in position for use by a young animal; and a closable all-weather vent apparatus comprising a raised neck protruding from the shelter roof, a generally horizontal wall portion supported on the neck with at least one vent opening in the wall portion, a cap having a peripheral flange fitted about the raised neck, at least one support lug extending from the underside of the cap, said lug fitting within the vent opening when the cap is in a lowered closed position and said cap being rotatable relative to the neck to a raised position wherein the lug is supported on the vent wall portion and a ventilation path is established from the vent opening between the flange and the neck and wherein rain and snow are prevented from entering the vent opening by an overlap of the flange over the neck.

2. The apparatus of claim 1 wherein the feed bucket is a generally tapered shape with a larger top opening than its bottom, said bucket having an extended portion of the perimeter of the top forming a splash panel, said splash panel having a handgrip opening near its upper edge so that the splash panel forms a handle for lifting the tapered feed bucket and wherein the circular fitting has a lip reverse tapered to receive the tapered feed bucket.

3. The apparatus of claim 1 wherein the bottle bracket comprises an enclosed housing extending from the outside of the shelter through the wall at a downward angle, said bottle bracket having an opening at an outer end for permitting insertion and removal of a bottle having a nipple from the exterior of the shelter, and said bracket having a ole at its innermost point for receiving the nipple of the bottle the hole being sized to prevent the nipple from being pulled off the bottle and through the hole.

4. In a freestanding, one-piece molded shelter for young animals, the improvement comprising:

a closable vent apparatus, said vent apparatus comprising a raised neck protruding from a shelter roof, a generally horizontal wall portion supported on the neck with at least one vent opening in the wall portion, a cap having a peripheral flange fitting about the raised neck, at least one support lug extending from the underside of the cap, said lug fitting within the vent opening when the cap is in a lowered closed position, said cap being rotatable relative to the neck to a raised position where the lug is supported on the vent wall portion and a ventilation path is established from the vent opening between the flange and the neck and wherein rain and snow are prevented from entering the vent opening by an overlap of the flange over the neck, said peripheral flange having a lower edge which seals the vent apparatus when the cap is in the lowered position.

5. The apparatus of claim 4 wherein the raised neck and cap are circular.

6. The apparatus of claim 4 further comprising an air inlet and animal access opening in an exterior side wall of the shelter.

7. The apparatus of claim 4 wherein the one-piece animal shelter is molded of polyethylene.

8. For use in a freestanding, one-piece molded shelter for animals, the improvement of a ventilation system comprising:

an air inlet in an exterior side wall of the shelter; and a closable outlet vent apparatus generally centrally located in a roof of the shelter, the outlet vent apparatus including a raised neck protruding from the shelter roof with a top raised area having outlet openings, and a cap having a peripheral flange for fitting about the raised neck, the cap having a closed position for blocking the outlet openings and an open position for allowing air passage through the outlet openings, the inlet opening and the outlet vent apparatus combining to provide a ventilating air flow in through the inlet opening, through the shelter and out through the outlet vent apparatus in the roof to evacuate heated air from the shelter.

9. For use in an exterior wall of a freestanding, one-piece animal shelter, the improvement of a feeding system for holding a feeding bottle for young animals of the type having a removably attached feeding nipple, the system comprising:

a bottle bracket opening in an exterior wall of a shelter, spaced upwardly from the bottom to a height suitable for access by a feeding animal; and a bottle bracket which includes an enclosed housing mounted in the wall by insertion from the exterior through the bottle bracket opening and by attachment to the wall, the housing extending from the outside of the shelter through the wall at a downward angle, the bottle bracket having a receptacle at its outer end for permitting insertion and removal of the bottle from the exterior of the shelter, and said housing having a hole at its innermost wall for receiving the nipple of the bottle to permit animal feeding inside the shelter, the hole being sized to prevent the nipple from being pulled from the bottle and through the hole.

10. The apparatus of claim 9 wherein the bottle is of the type with a generally square cross section and the housing has a generally square cross section sized to snugly engage the bottle.

11. The feeding system of claim 9 wherein the bottle bracket is molded in one piece of polyethylene.

* * * * *